No. 616,659. Patented Dec. 27, 1898.
P. W. GATES & T. W. CAPEN.
ROCK OR ORE BREAKER.
(Application filed Apr. 30, 1897. Renewed Oct. 27, 1898.)
(No Model.)   5 Sheets—Sheet 4.
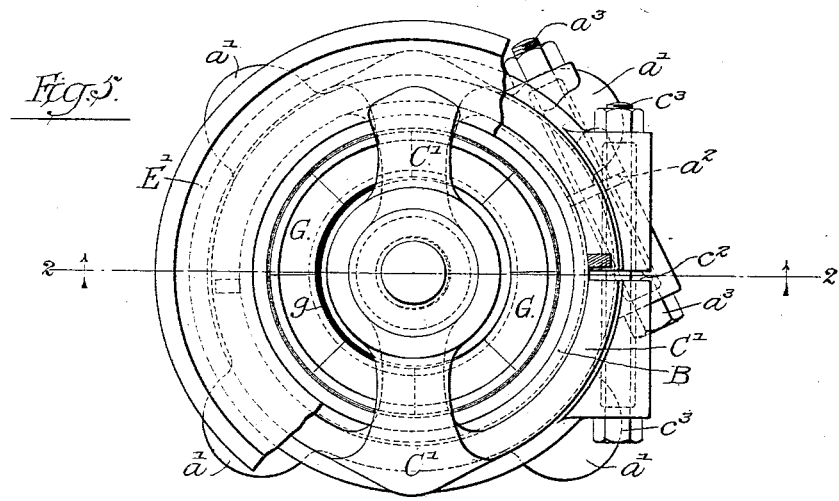
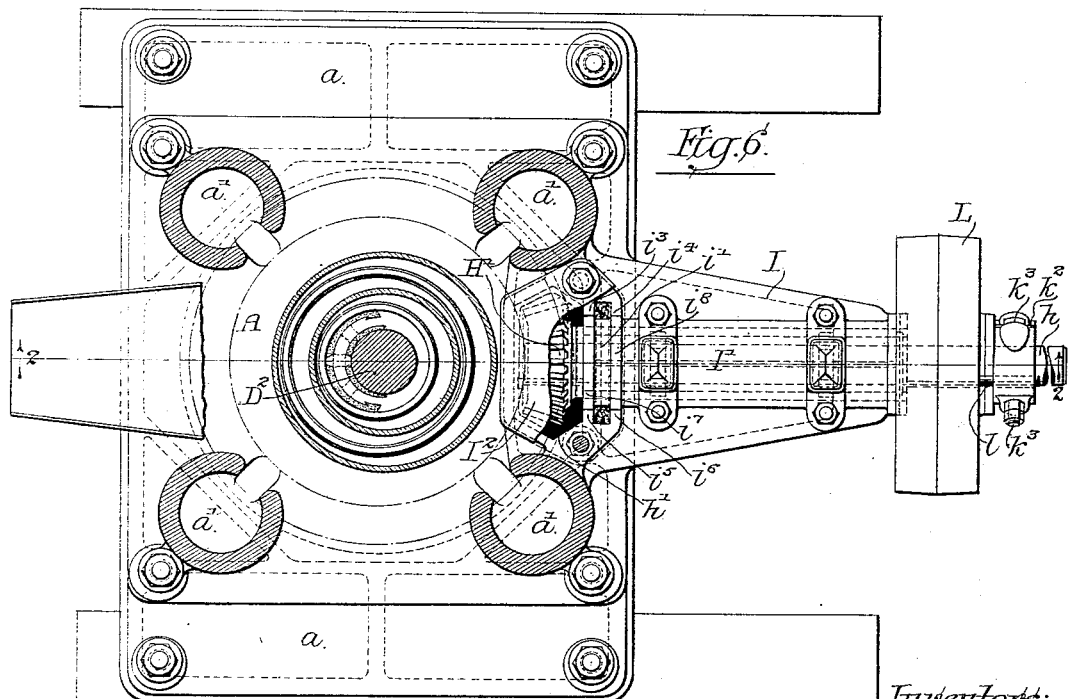
Witnesses:—
Louis M. F. Whitehead.
Thomas C. McGregor.
Inventors:—
PHILETUS W. GATES.
THOMAS W. CAPEN.
by Banning and Banning and Payson
Attorneys.

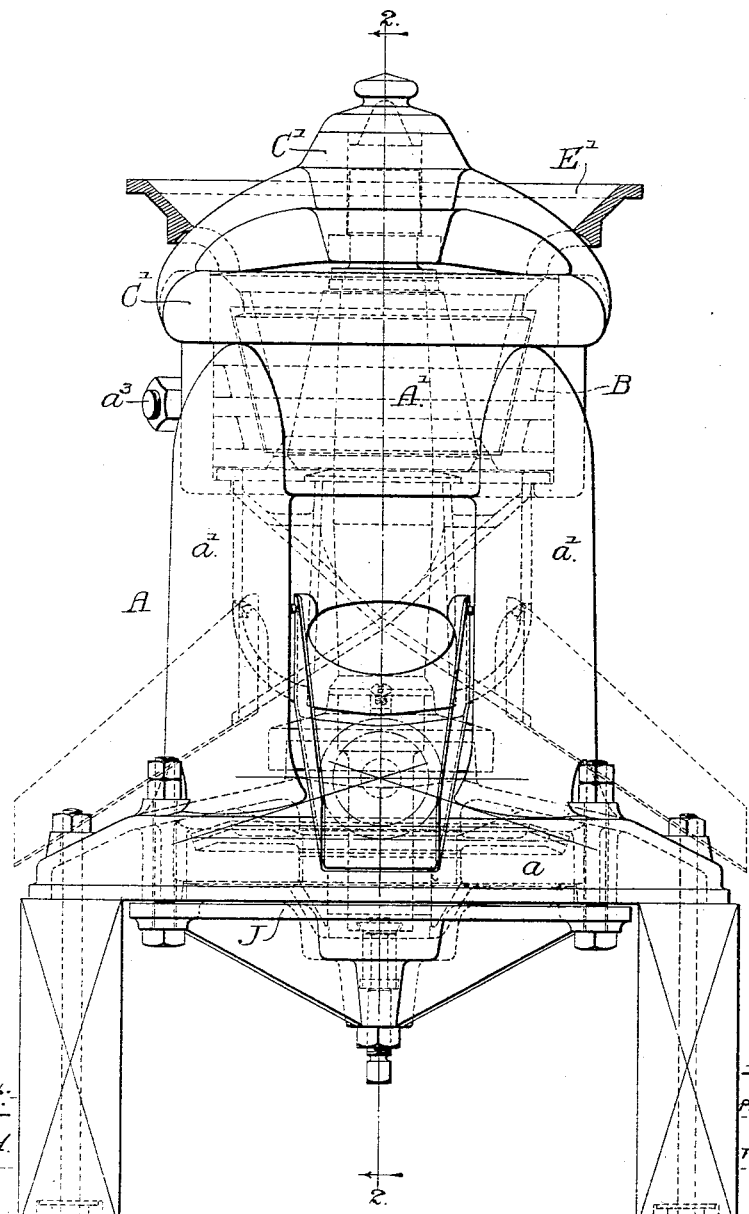

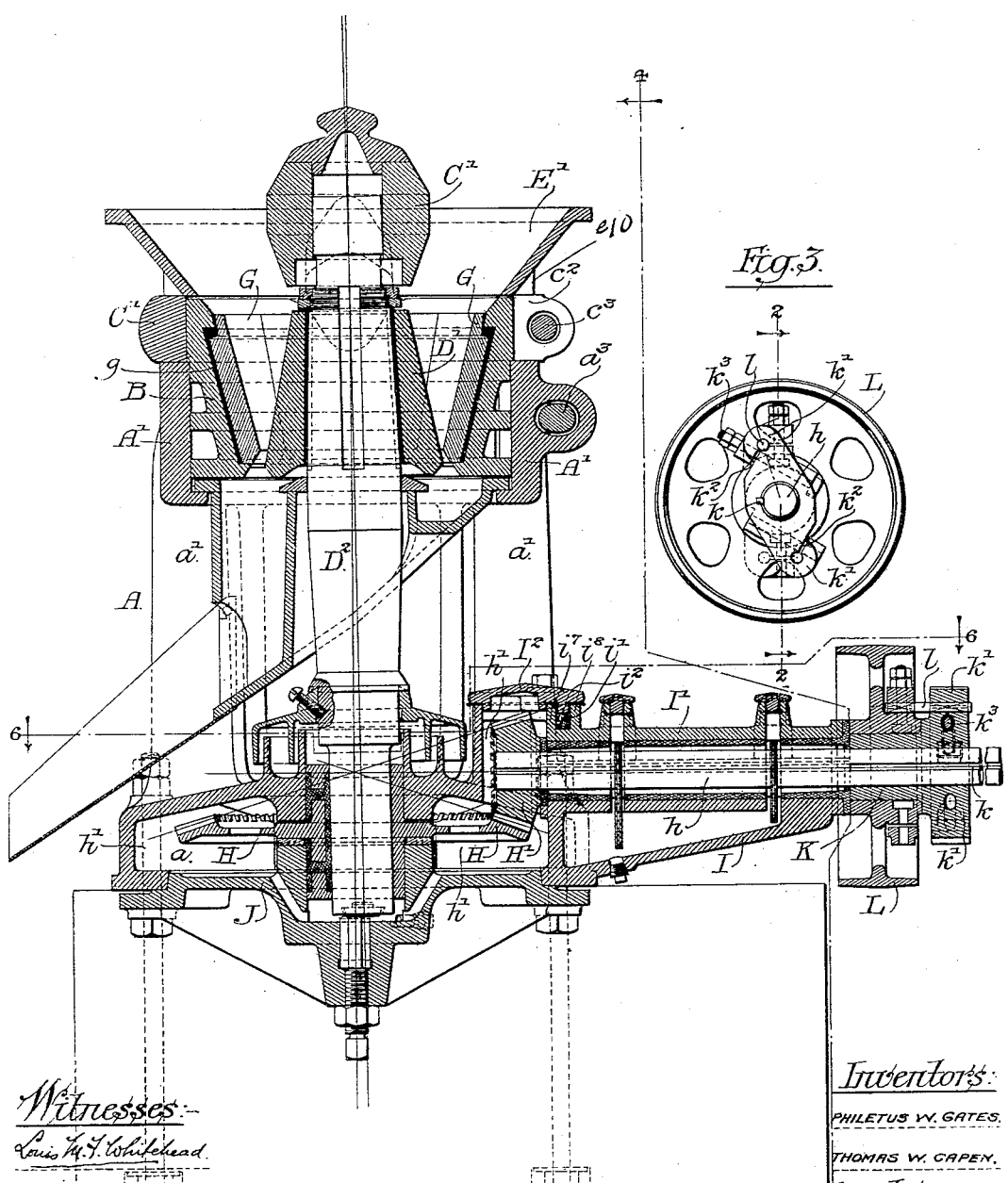

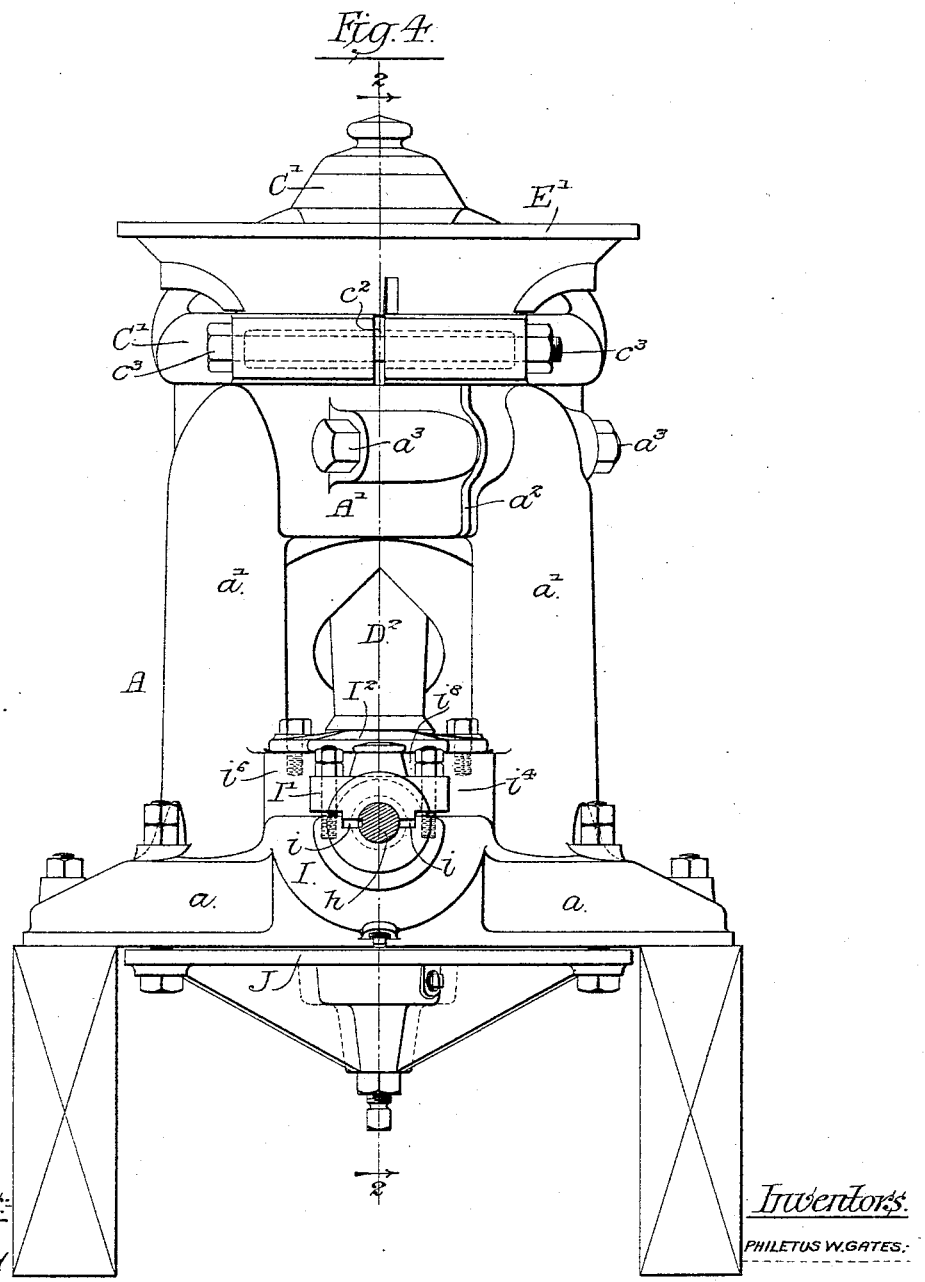

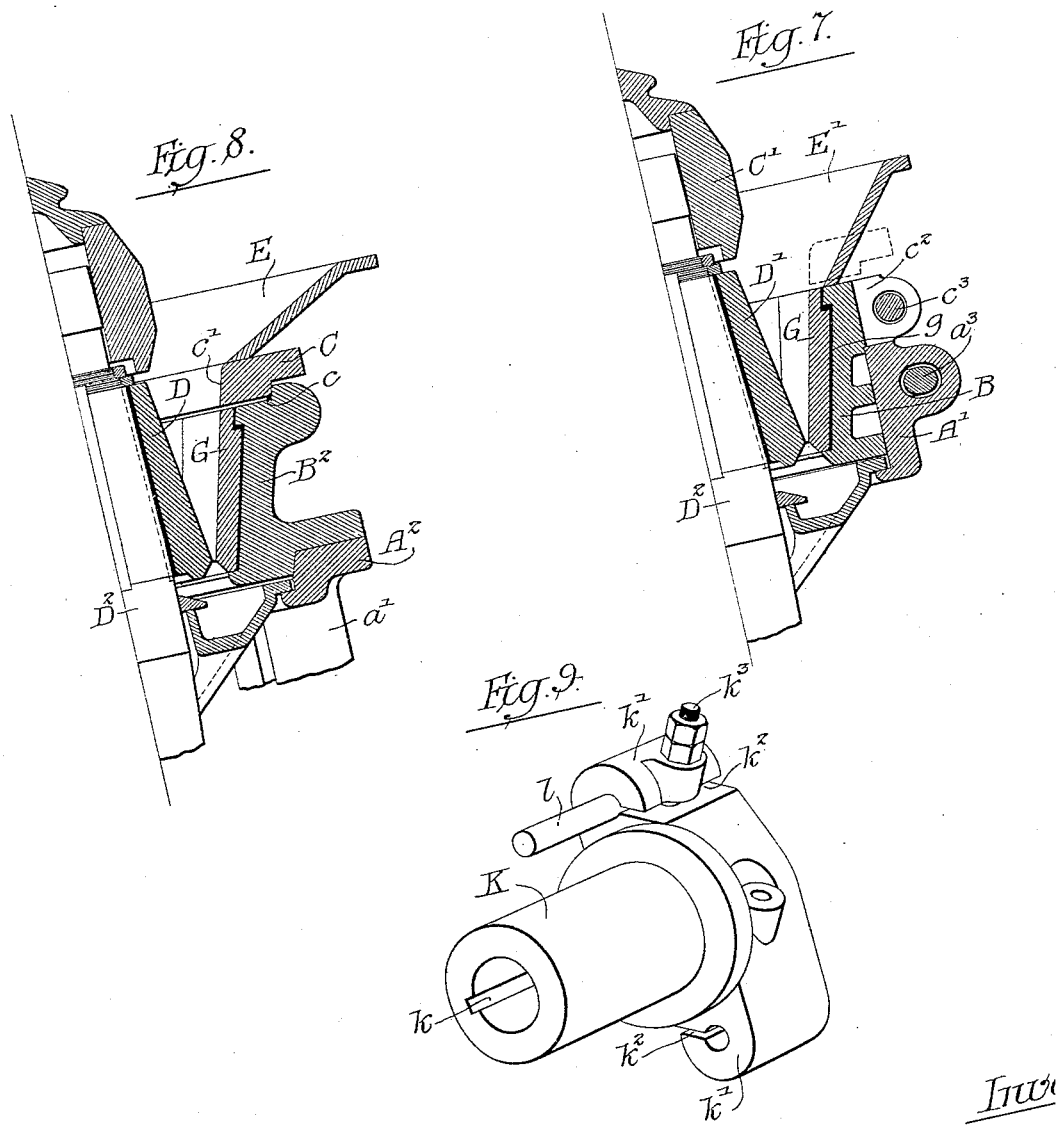

UNITED STATES PATENT OFFICE.

PHILETUS WARREN GATES AND THOMAS W. CAPEN, OF CHICAGO, ILLINOIS, ASSIGNORS TO THE GATES IRON WORKS, OF SAME PLACE.

ROCK OR ORE BREAKER.

SPECIFICATION forming part of Letters Patent No. 616,659, dated December 27, 1898.

Application filed April 30, 1897. Renewed October 27, 1898. Serial No. 694,742. (No model.)

*To all whom it may concern:*

Be it known that we, PHILETUS WARREN GATES and THOMAS W. CAPEN, citizens of the United States, residing at Chicago, in the county of Cook and State of Illinois, have invented certain new and useful Improvements in Rock or Ore Breakers, of which the following is a specification.

The object of our invention is to provide a simple, economical, and efficient rock and ore breaker; and the invention consists in the features, combinations, and details of construction hereinafter described and claimed.

In the accompanying drawings, Figure 1 is a front elevation of a machine constructed in accordance with our improvements; Fig. 2, a sectional elevation taken on lines 2 2 of Figs. 1, 3, 4, 5, and 6, looking in the direction of the arrows; Fig. 3, a rear end view of the driving mechanism shown to the right of Fig. 2; Fig. 4, a rear view of the machine, taken on lines 4 4 of Fig. 2, looking in the direction of the arrows; Fig. 5, a plan view of the machine, looking at it from the top, with part of the hopper broken away; Fig. 6, a sectional plan view of the machine, taken on line 6 6 of Fig. 2, looking in the direction of the arrows; Fig. 7, a sectional view of a portion of the upper part of the machine, showing the head raised up to its limit; Fig. 8, a similar view to that shown in Fig. 7, illustrating the old form of spider as attached to the upper shell; and Fig. 9, a perspective view of the driving-pulley sleeve and clamp for holding the break-pins.

In the art to which this invention relates it is well known that there are serious objections to the manner in which the top shell is held in place—that is, the shell which usually holds the concaves. Further, it is well known that there are serious objections to the manner in which the spider is secured to the top shell in that it is sometimes within the working range of the crushing-head, as shown in Fig. 8. It is also well known that there are various other objections in the use of mechanisms constructed as at present in that the break-pins become loose and also that the oil or lubricant used for the gear and eccentric is thrown out of its chamber, causing considerable annoyance.

The principal object of our invention, therefore, is to provide a simple, economical, and efficient rock and ore breaker in which the above objections are obviated, as will more fully hereinafter appear.

In describing our improvements we will only describe those parts or portions which we consider to be new in connection with so much that are old as will enable those skilled in the art to understand and practice the invention, leaving out of consideration old and well-known mechanism, which if described in detail here would only tend to confusion and ambiguity.

In constructing a machine in accordance with our improvements we make a frame portion A of the desired size, shape, and strength and adapted to support, contain, and hold the various portions in their operative positions. This frame is preferably constructed of a base $a$, having four pillars $a'$ arranged thereon, which support a circular portion A', all formed in one integral portion. This circular portion is split, as shown at $a^2$, and provided with a clamping-bolt $a^3$ for the purpose of contracting such portion and holding an annular shell B in its operative position. Ordinarily the frame is made of a lower base and an upper shell, which are provided with flanges and bolted together, though in some instances they have been made in one integral portion. There are various objections to these constructions in that the machine is subjected to excessive strains and considerable difficulty is encountered in the fitting and securing of the parts in operative position.

The old method of securing the upper shell to the lower base is illustrated in Fig. 8, in which $A^2$ represents the lower frame portion, and $B^2$ the upper shell. In this figure it will be noticed that the spider portion C is fitted in a chamber-recess $c$ in the upper shell and is bolted firmly in this position. It will be noticed that the upper portion of the crushing-head D can come opposite the inner surface $c'$ of the spider, and at times this is objectionable, because as the material is fed in from the hopper E it is grasped between the upper portion of the crushing-head and the inner surface of the spider, and as such spider is not constructed to withstand the heavy strain of crushing the grasping of the material between it and the head oftentimes results in the destruction of the parts. In order to overcome this objection, we insert an annular-shell portion in the lower frame and clamp it therein, as above described, allowing a portion of it to project above the main body portion, so as to be encircled by the spider portion, hereinafter described. Around the upper portion of the annular shell we pass the rim of the spider C' and split such rim, as at $c^2$, using a clamping-bolt $c^3$ to firmly secure the spider to the upper portion of the shell. The portion of the annular shell at its inner side is tapered, so that the hopper E' therein may be firmly held in place in any desired manner, preferably by securing it to the spider by passing bolts through the lugs $c^{10}$. This structure is shown particularly on Fig. 2, and from an examination of this figure it will be seen that the spider is entirely removed from the working range of the crushing-head D', which is secured to the gyrating shaft $D^2$ in any of the usual ways. The concave crushing-ring G is made in several parts, secured in the annular shell by being placed therein and Babbitt or soft metal $g$ placed between them and the shell, which acts to firmly key and hold the same in operative position. At the lower portion of Fig. 2 a beveled gear H is shown for gyrating the shaft $D^2$ by means of the driving-gear H', which is secured to the driving-shaft $h$. These gears are inclosed in a chamber $h'$, which is adapted to be filled with oil or other lubricant in order to minimize friction force and facilitate the operation of the parts. Ordinarily, as shown in present constructions, the gears act as a pump—especially the driving-gear—to force the lubricant out through the bearing portions of the side walls thereof. In order to overcome these objections and provide a chamber for this crusher which will be hermetically sealed and prevent the ordinary escape of lubricant, we make a bearing-bracket I and prefer to form it integral with the lower frame portion. This bearing-bracket forms the lower half-bearing for the journal of the driving-shaft and the upper portion I' may be removed. The upper wall of the chamber $h'$ is constructed with an open-top box which incloses the driving-gear H', except on a portion of the back side where the shaft for said gear enters the box, and on this side such part is made with two walls, as shown at $l^3, l^4, l^5$, and $l^6$, forming part of the space $i'$. The balance of this space is formed by raising walls $i^7$ $i^8$ on the upper side of the box I', which correspond with the walls $l^3, l^4, l^5$, and $l^6$. The lower portion of the box I' is fitted into a recess or channel $i$, so as to position the same, and the bolts merely act as holding or securing mechanism, as shown in Fig. 4. In order to hermetically seal the driving-gear box, packing is inserted in the space $i'$, so that when the cap $I^2$ is placed in position a projection $i^3$ on the lower portion thereof will contact the packing and make a liquid-tight joint. At the same time the parts are so constructed and arranged that the gearing may be removed without disturbing the rest of the mechanism. It will be seen that the bottom J of the machine is removably secured in position, so that the gear for gyrating the shaft may be removed through the lower portion of the machine.

In present structures it is well known that the break-pin causes considerable trouble and annoyance in that it becomes loose and rattles in its socket. In order to overcome this objection, we make a sleeve portion K, which is keyed to the driving-shaft by means of a key and spline $k$, as shown particularly in Figs. 2, 3, and 9. On this sleeve the driving-pulley L is loosely mounted, so that ordinarily it would be permitted to rotate without driving the mechanism. In order to provide safety driving mechanism between the driving sleeve and pulley, so as to preserve the parts from damage by excessive strains, a break-pin $l$ is provided and grasped, as shown in Fig. 2, by the driving-pulley and arms $k'$ on the driving-sleeve. In order to hold this in position, we slot the driving-sleeve, as at $k^2$, and pass the clamping-bolt $k^3$ through the same, as shown particularly in Fig. 9. By tightening this clamping-bolt the break-pin is firmly held against any play whatever, so that during running or operating of the machine such break-pin does not become loose and cause trouble or annoyance. It is necessary that this break-pin be held firmly and rigidly in order that the machine may operate properly, and this means of clamping which we have devised secures it in a satisfactory and economical manner. It is understood that the same clamping device is used to secure the other end of the break-pin to the driving-pulley L.

While we have described our invention with more or less minuteness as regards details and as being embodied in certain precise forms, we do not desire to be limited thereto unduly or any more than is pointed out in the claims. On the contrary we contemplate all proper changes in form, construction, and arrangement, the omission of immaterial elements and substitution of equivalents, as circumstances may suggest or render expedient.

We claim—

1. In a rock and ore breaker, the combination of a frame or base portion provided with an upper encircling portion, an annular-shell portion provided with crushing-concaves inserted within the upper encircling portion and having its upper portion projecting above the same, means for securing the upper encircling portion and the annular shell together, a spider portion encircling the upper portion of the annular shell, and means for securing it to the annular shell, substantially as described.

2. In a rock and ore breaker, the combination of a lower frame or base portion provided with an upper circular portion split longitudinally, an annular-shell portion provided with crushing-concaves inserted within the circular portion and having its upper portion projecting above the same, bolt mechanism for clamping the upper circular portion and annular shell together, a spider portion split longitudinally encircling the upper part of the annular shell, and bolt mechanism for clamping the spider portion to the annular shell, substantially as described.

3. In a rock and ore breaker, the combination of a frame portion provided with a projecting bearing-bracket forming a part of the closure of the oil-chamber in which the driving-gear mechanism operates, an upper removable box portion provided with a recess groove or channel arranged to hold a filling of packing material, and a cap portion arranged to be secured thereto and compress the packing so as to form a hermetical joint, substantially as described.

4. In a rock and ore breaker, the combination of a gyrating shaft, a horizontal driving-shaft, gear mechanism intermediate of such shafts to transmit power and motion from one to the other, a driving-pulley, lugs secured to the driving-shaft so as to rotate therewith and slitted longitudinally to form clamps, break-pins inserted in the clamp portions and in the driving-pulley, and clamping-bolts for closing the clamps to grasp the pins, substantially as described.

5. In a rock and ore breaker, the combination of a gyrating shaft, gear mechanism for operating the same, a horizontal driving-shaft, a sleeve portion secured thereto, a driving-pulley mounted upon the sleeve, projections on such driving-sleeve slitted longitudinally to form clamps, break-pins inserted in such clamp portions and in the driving-pulley, and clamping-bolts for closing the clamps to grasp the pins, substantially as described.

PHILETUS WARREN GATES.
THOMAS W. CAPEN.

Witnesses:
HENRY WOODLAND,
HERMAN M. VANCE.